United States Patent

Ng et al.

Patent Number: 5,121,224
Date of Patent: Jun. 9, 1992

[54] REPRODUCTION APPARATUS WITH SELECTIVE SCREENING AND CONTINUOUS-TONE DISCRIMINATION

[75] Inventors: Yee S. Ng, Fairport; Hwai-Tzuu Tai, Rochester, both of N.Y.

[73] Assignee: Eastman Kodak Company, Rochester, N.Y.

[21] Appl. No.: 531,662

[22] Filed: Jun. 1, 1990

[51] Int. Cl.$^5$ .............................................. H04N 1/00
[52] U.S. Cl. .................................. 358/462; 358/464; 382/9; 382/51
[58] Field of Search ............... 358/462, 464, 466; 382/9, 18, 51

[56] References Cited

U.S. PATENT DOCUMENTS

| | | | |
|---|---|---|---|
| 4,194,221 | 3/1980 | Stoffel | 358/283 |
| 4,411,015 | 10/1983 | Scherl et al. | 382/51 |
| 4,556,916 | 12/1985 | Matsunawa | 358/282 |
| 4,578,712 | 3/1986 | Matsunawa | 358/282 |
| 4,654,720 | 3/1987 | Tozawa | 358/283 |
| 4,656,665 | 4/1987 | Pennebaker | 382/51 |
| 4,710,822 | 12/1987 | Matsunawa | 358/280 |
| 4,740,818 | 4/1988 | Tsilibes et al. | 355/14 R |
| 4,856,075 | 8/1989 | Smith | 382/50 |

*Primary Examiner*—Leo H. Boudreau
*Assistant Examiner*—Andrew W. Johns
*Attorney, Agent, or Firm*—Milton S. Sales

[57] ABSTRACT

Automatic identification of continuous-tone segments of an original document so that such segments can be screened is accomplished by converting the original image into a series of electrical signals characteristic of the optical density gray level of image pixels, calculating the gray level histogram for pixels within defined regions of the original image, and providing signals related to the position of the continuous-tone segment on the basis of the gray level histograms for each region of the original image.

10 Claims, 5 Drawing Sheets

REPRODUCTION APPARATUS WITH SELECTIVE SCREENING AND CONTINUOUS-TONE DISCRIMINATION

BACKGROUND OF THE INVENTION

1. Technical Field

This invention relates generally to the reproduction of originals having both continuous-tone segments and other content segments, and more particularly to the discrimination of continuous-tone image segments.

2. Background Art

In reproducing originals using an electrophotographic reproduction apparatus, it is desirable to reproduce continuous-tone information segments of the original by halftone screening in order to extend the tone scale of the electrophotographic process. However, screened areas of the image outside the continuous-tone segment in an already halftoned segment may create objectionable density known as "moire." In addition, where line-type information such as alphanumerics, logos, etc. is to be reproduced, it is desirable that this image information not be modulated by the halftone screen during the imaging process.

In U.S. Pat. No. 4,740,818, issued to G. Tailibes et al. on Apr. 26, 1988, apparatus and methods are described for producing reproductions from originals having continuous-tone segments and segments of other content types, such as halftone and/or line-type information. Coordinate signals are created by the operator to identify the position of an image segment to be screened. In response to the signals, a light source, independent of the imaging light source, forms an electrostatic latent halftone pattern on a portion of an image frame area of the photoconductive member which is to form the reproduction of the halftone screened area without the light source reproducing a screen pattern in other areas of the image frame.

While operator-created coordinate signals for identifying the continuous-tone segments of the original are effective, this process is time consuming, and is difficult to do in conjunction with an automatic recirculating document feeder. The Tailibes et al. patent also discloses an autocorrelator capable of distinguishing high frequency halftone information from other types of information, and means for discriminating between line-type and low frequency screened halftone information of the one hand and continuous-tone information on the other. Details of the autocorrelator and the discriminator can be found in U.S. Pat. No. 4,194,221, which issued to J. Stoffel on Mar. 18, 1980. The present invention provides an improved way to locate segments of an original document which have continuous-tone information.

DISCLOSURE OF INVENTION

It is an object of the present invention to provide for the automatic identification of continuous-tone segments of an original document so that such segments can be screened without screening other portions of the document.

It is another object of the present invention to provide for scanning an original document for automatic segmentation of continuous-tone portions of the document.

It is still another object of the present invention to provide for automatically calculating the boundaries of continuous-tone segments of an image.

It is yet another object of the present invention to provide for the automatic identification of continuous-tone segments of an original document by means of an optical density histogram so that such segments can be screened without screening other portions of the document.

It is another object of the present invention to provide for scanning an original document for automatic segmentation of continuous-tone portions of the document.

In accordance with the above and other objects, the present invention provides a method and apparatus for discriminating a continuous-tone segment of an original image from other portions of the image by converting the original image into a series of electrical signals characteristic of the optical density gray level of image pixels, calculating the gray level histogram for pixels within defined regions of the original image, and providing signals related to the position of the continuous tone segment on the basis of the gray level histograms for each region of the original image.

In accordance with another feature of the present invention, the step of providing signals related to the position of the continuous tone segment includes the step of identifying regions having low keyed histograms as being continuous tone segments.

In accordance with yet another feature of the present invention, the step of providing signals related to the position of the continuous tone segment includes the step of identifying regions having high keyed histograms as being regions of the other portions of the image.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

BEST MODE FOR CARRYING OUT THE INVENTION

Because electrophotographic reproduction apparatus are well known, the present description will be directed in particular to elements forming part of, or cooperating more directly with, the present invention. Apparatus not specifically shown or described herein are selectable from those known in the prior art.

Figure 1:
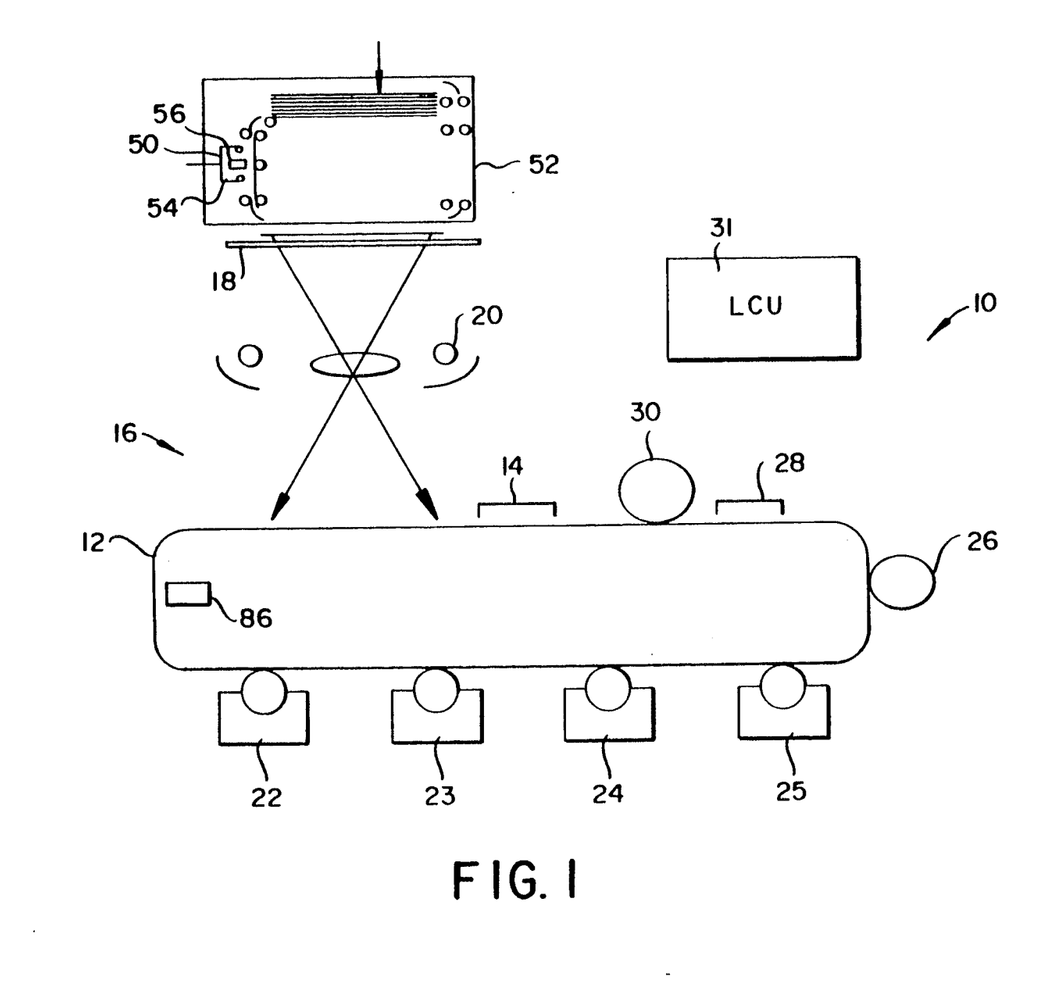
FIG. 1 is a schematic front elevational view showing the general arrangement of electrophotographic reproduction apparatus that is in accordance with the present invention.

With reference to FIG. 1, an electrophotographic reproduction apparatus 10 includes a photoconductor in the form of an endless or continuous web 12. The web is driven in a clockwise direction as illustrated to cause successive image areas of the web to sequentially pass a series of electrophotographic work stations of the copier.

For the purpose of the instant disclosure, several copier work stations are shown along the web's path. These stations will be briefly described.

First, a conventional charging station 14 is provided at which the photoconductive surface of web 12 is sensitized by applying to its photoconductive surface a uniform electrostatic primary charge of a predetermined voltage.

At an exposure station 16, a light image of a document sheet supported on transparent platen 18 is projected onto the photoconductive surface of web 12. While the apparatus will be described with respect to reflection exposure of the original document sheet onto the photoconductive surface, the use of transmission exposures of an original is also contemplated by the invention. The projected image dissipates the electrostatic charge at the light exposed areas of the photoconductive surface and forms a latent electrostatic image. A programmable power supply controls the intensity or duration of light from flash lamps 20 to adjust the exposure level incident upon the web.

A plurality of development stations 22-25 include developer which may consist of iron carrier particles and differently pigmented electroscopic toner particles with an electrostatic charge opposite to that of the latent electrostatic image. Developer is brushed over the photoconductive surface of web 12, and toner particles adhere to the latent electrostatic image to form a visible toner particle, transferable image. The development station may be of the magnetic brush type with one or two rollers.

Apparatus 10 also includes a transfer station 26 at which toner images on web 12 are transferred to receiver sheets; a preclean charger 28; and a cleaning station 30, at which the photoconductive surface of web 12 is cleaned of any residual toner particles remaining after transfer. After the transfer of unfixed toner images to a receiver sheet, the sheet is transported to a fuser, not shown, where the image is fixed.

A logic and control unit (LCU) 32 has a digital computer, preferably a microprocessor. The microprocessor has a stored program responsive to the input signals for sequentially actuating then de-actuating the work stations as well as for controlling the operation of many other machine functions as disclosed in U.S. Pat. No. 3,914,047. Programming of a number of commercially available microprocessors is a conventional skill well understood in the art. This disclosure is written to enable a programmer having ordinary skill in the art to produce an appropriate control program for the one or more microprocessors used in this apparatus. The particular details of any such program would, of course, depend on the architecture of the designated microprocessor.

Figure 2:
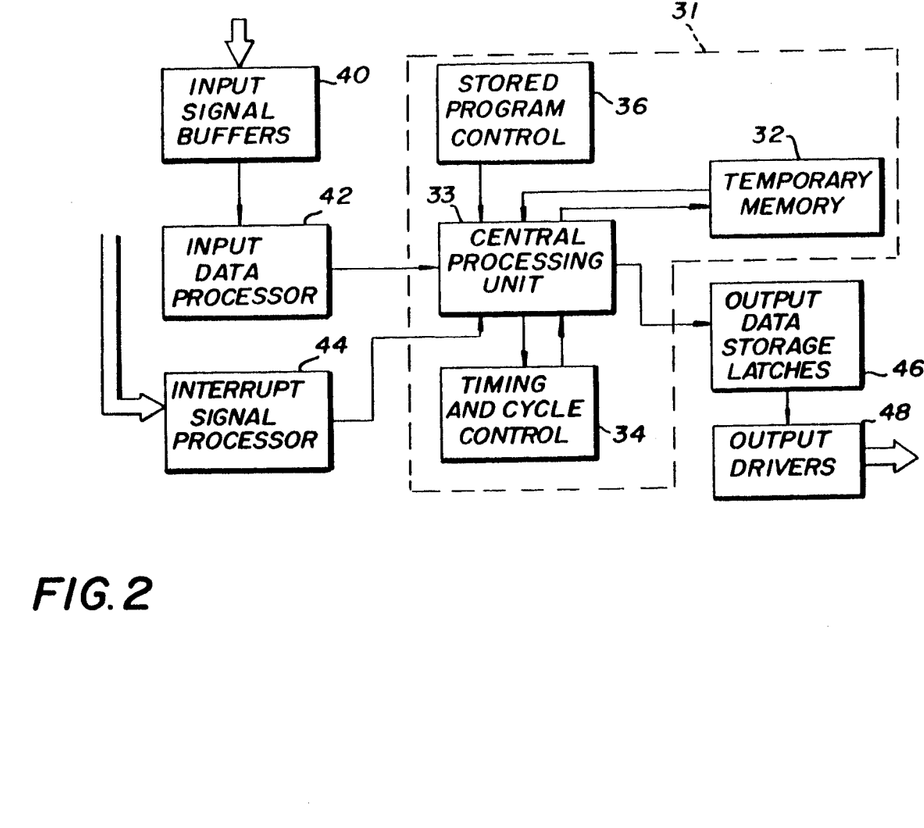
FIG. 2 is a schematic block diagram illustrating a logic and control unit for the apparatus of FIG. 1.

With reference also now to FIG. 2, a block diagram of logic and control unit (LCU) 31 is shown which interfaces with the apparatus 10 and a document feeding apparatus (FIG. 1) that includes known recirculating feeder means. LCU 31 consists of temporary data storage memory 32, central processing unit 33, timing and cycle control unit 34, and stored program control 36.

Input data are applied either through input signal buffers 40 to an input data processor 42 or to an interrupt signal processor 44. The output data and control signals are applied to storage latches 46 which provide inputs to suitable output drivers 48, directly coupled to leads. These leads are connected to the various work stations, mechanisms and controlled components associated with the apparatus.

As mentioned above, an object of the present invention is to provide for automatic screening of continuous-tone segments of images. As detailed below, coordinate information is inputted into temporary memory 32 regarding the location of the image segments containing the continuous-tone information. To enable LCU 31 to receive this information, a CCD scanner 50 is provided in a recirculating document feeder 52. The CCD scanner has a pair of illuminator lamps 54 and an array 56 of charge-coupled devices. Scanner 50 may be a, say, 5,000 element linear array of about 400 dots per inch.

Figure 3:
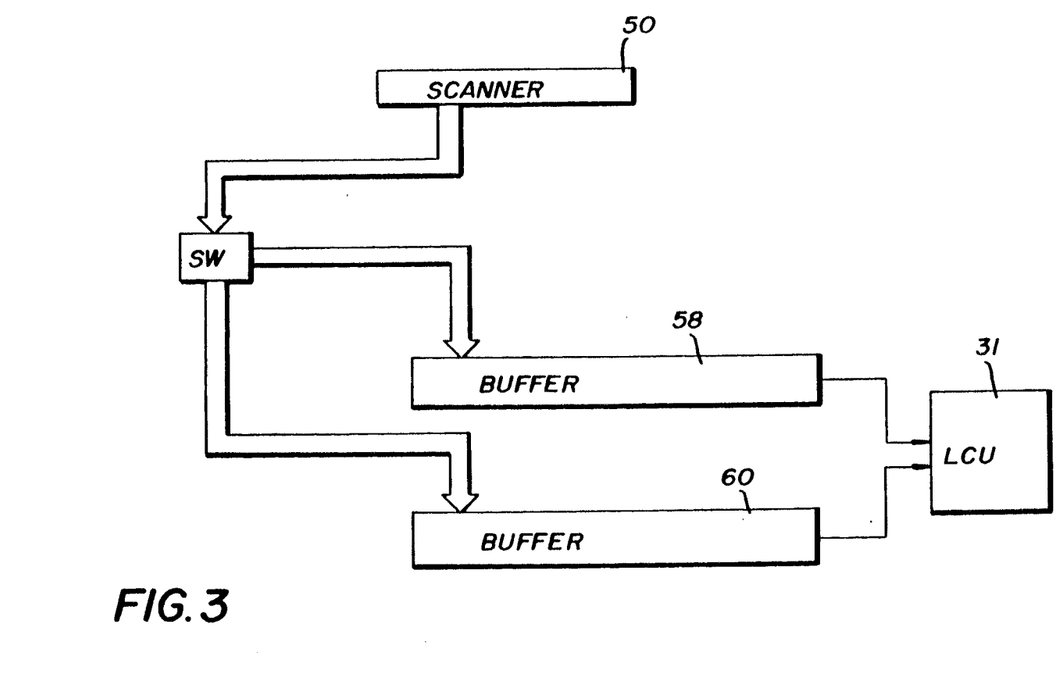
FIG. 3 is a block diagram of a scanner and memory device for the apparatus of FIG. 1.

As shown in FIG. 3, as a page is being scanned, the output of CCD array 56 is loaded into a pair of band buffers 58 and 60; each buffer having, say, 50,000 cells so as to be able to hold ten lines of data from the 5,000 element CCD array. The buffers are divided into 10×10 element sub-blocks and the data in one filled buffer is inputted into logic and control unit 31 while the other buffer is being filled.

Figure 4:
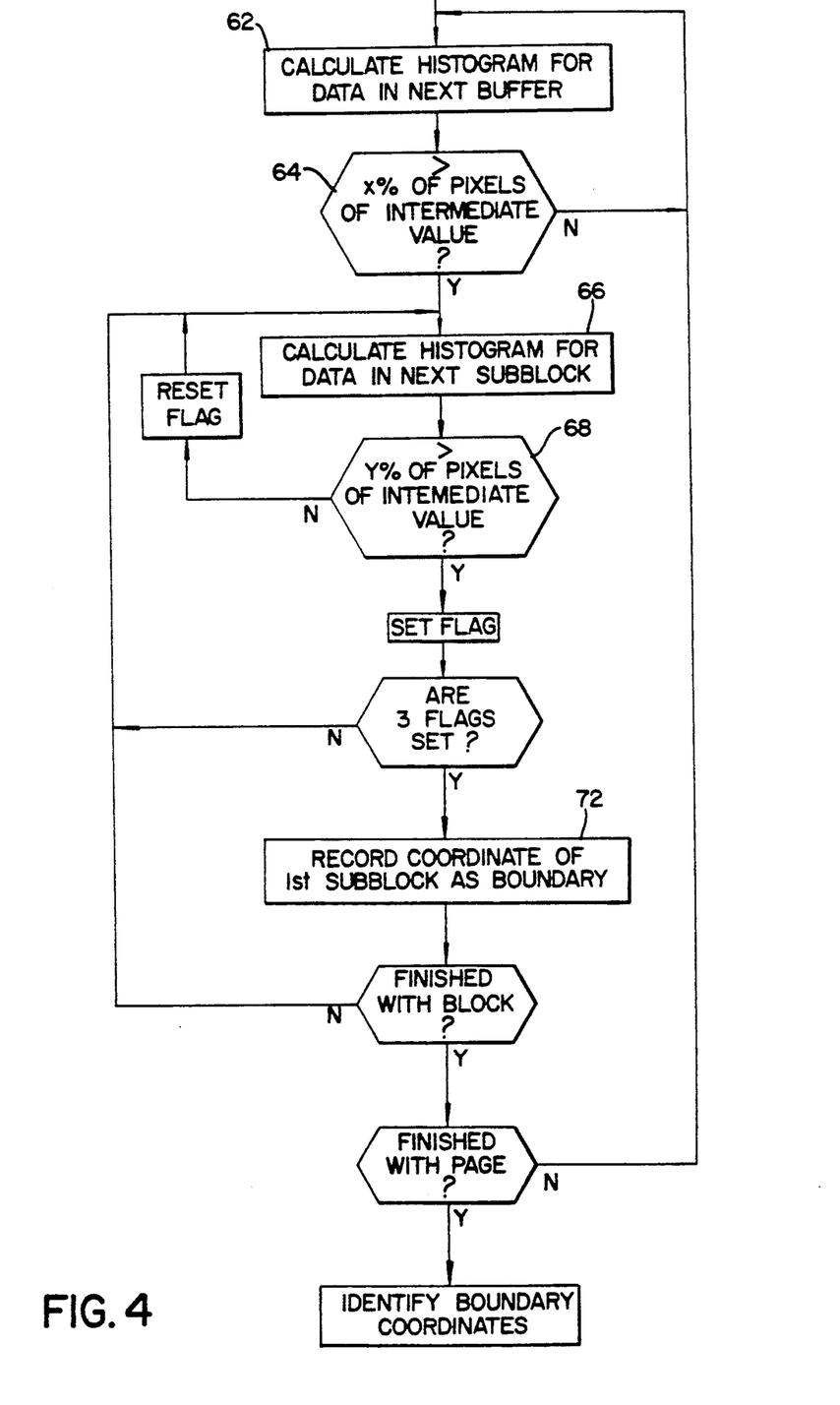
FIG. 4 is a logic flow chart of the operation of the apparatus of FIG. 1.

Referring to FIG. 4, after one buffer is filled, the gray level histogram for that buffer is calculated (62) as the other buffer fills. A gray level histogram is a function showing, for each gray level, the number of pixels in the image that has that gray level. When plotted, the abscissa is gray level and the ordinate is the frequency of occurrence (number of pixels). When an image is condensed into a histogram, all spacial information is discarded. That is, the histogram specifies the number of pixels having each gray level but gives no hint as to where those pixels are located within the image. Computation of a gray level histogram during transfer of image data is a simple, conventional process.

Figure 5:
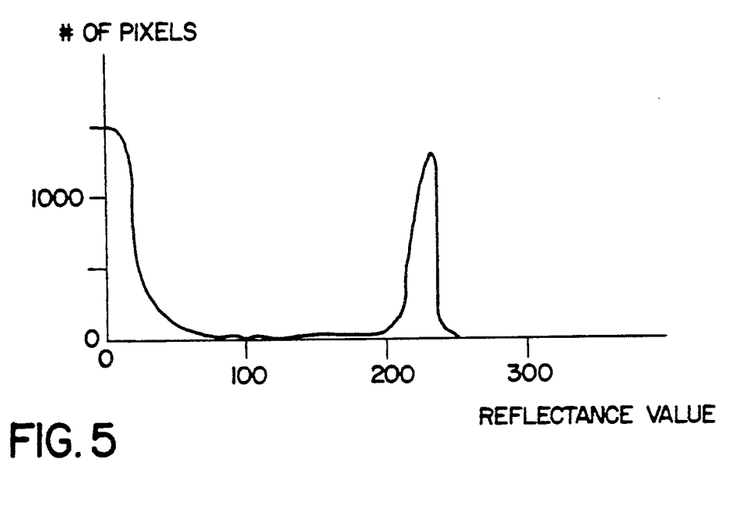
FIG. 5 is an example of a "high key" histogram.
Figure 6:
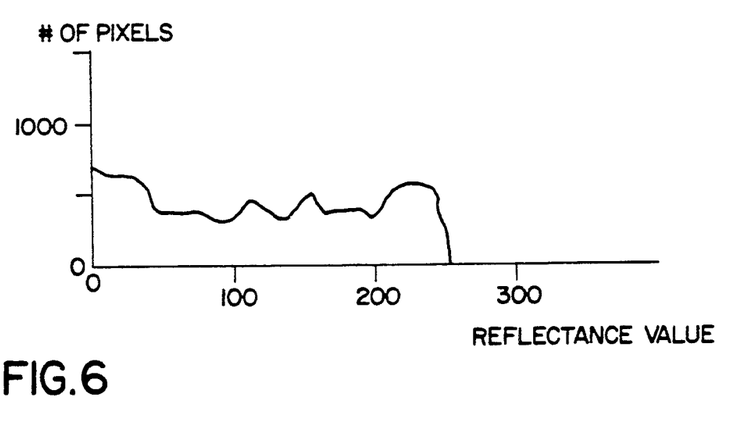
FIG. 6 is an example of a "low key" histogram.

When the histogram for the entire buffer is calculated, the program determines (64) if the histogram contains more than a predetermined percent, say 10% to 20%, of pixels within given range of intermediate reflectance values. Image segments that have only text, graphics, and/or halftones generally will have a "high keyed" gray level histogram. A high keyed histogram is one which exhibits many pixels of low reflectance values and/or many pixels of high reflectance values, but relatively few pixels of intermediate reflectance values. Such a histogram is illustrated in FIG. 5. Segments that have continuous-tone content will have many pixels with intermediate reflectance values as shown in FIG. 6. Therefore if the histogram of the buffer content indicates a high key histogram, it is very likely that this 10×5000 pixel block of the document does not include a meaningfully large continuous-tone image, and the logic loops back to proceed with the next buffer.

On the other hand, if the 10×5000 pixel segment of the document does include a meaningfully large continuous-tone image, the logic assumes that there is at least one continuous-tone segment present. To locate the boundaries of the continuous-tone segment(s), the 10×5000 pixel block is subdivided into 10×10 pixel sub-blocks. Processing the sub-blocks from one side to the other, histograms are done for each sub-block (66). If there are a large percentage of pixels in a sub-block with an intermediate reflectance value (68), the sub-block coordinates and its gray level value distribution are recorded. If at least three adjacent sub-blocks exhibit a large percentage of pixels with an intermediate reflectance value, it is assumed that the boundary of a continuous-tone segment has been located (72).

After a 10×5000 block has been processed, the logic moves to the next 10×5000 block, and so on. As more sub-blocks are identified as potential boundaries, the software links up the potential boundaries and eliminates boundaries within boundaries so that only the outer boundaries outlining the continuous-tone segment still remain in the memory (74).

After the entire page is scanned, the outer coordinates can be linked and smoothed mathematically to identify coordinates to be selectively screened. Boundary formation is a conventional method for image segmentation. In general, boundary formation techniques involve the application of an edge thinning and edge following to extract and link a meaningful closed contour of a segment.

If no continuous-tone segments are present on the original page, a regular optical exposure is made and the latent image on the photoconductor web will be developed, transferred and fused in the conventional manner.

Figure 7:
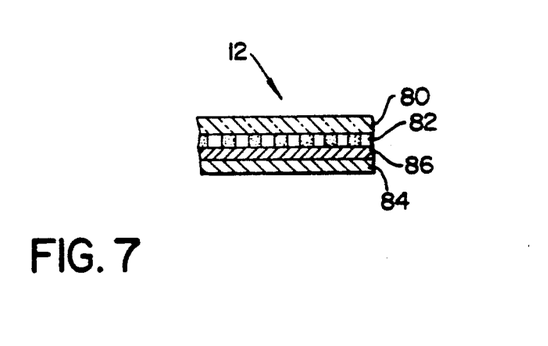
FIG. 7 is a schematic illustration in cross-section of some of the elements forming a multi-layered photoconductive member for use in the apparatus of FIG. 1.

With reference now to FIG. 7, it will be noted that photoconductive web 12 comprises a transparent support 80, a halftone screen 82, a conductive layer 84, and a photoconductive layer 86. For a more complete description of the photoconductive web 12 and its screen, see U.S. Pat. No. 4,294,536, filed in the name of Paxton and issued Oct. 13, 1981.

As previously described, image exposure is effected by flash lamps 20, which form a latent electrostatic image of the document sheet on the web. Formation of a plurality of charge islands within the latent electrostatic image is effected by a second exposure through the rear of the web and through the integral halftone screen formed in the web. This rear exposure may be carried out prior to, simultaneous with, or after image exposure of the photoconductor, the only requirement being that this rear exposure be carried out after charging by charger 14 and prior to development.

With reference again to FIG. 1, there is shown a light source 86 for illuminating the screen from the rear of the web. Light source 86 comprises a plurality of light-emitting diodes coupled to output drives 48 of LCU 31 and extending transverse to the direction of web movement. Prior to, or as the frame on the photoconductive web upon which the image of the document sheet is to be formed passes the LED array, the LCU calculates which of the LED's to illuminate and the duration for such exposure. When a continuous-tone area begins to pass directly below the LED's, the appropriate LED's are illuminated by the LCU.

It should be appreciated that in the use of LED's as an illumination source, it is not necessary that, during a period of their being illuminated for exposing the screen onto the charged photoconductive layer, the LED's be continuously illuminated. Rather, each LED can have the respective electrical current thereto pulse-width modulated for a predetermined short period of time so, in essence, the illumination from each LED comprises a rapid series of flashes. The pulse width time or other parameter of each pulse for each LED can be individually tailored so that the LED's provide substantially equal light or a balanced output during each "flash."

While the apparatus shown is adapted for making of simplex copies, a duplex type of electrophotographic reproduction apparatus may be provided for handling duplex originals and providing special exposure as described above for such originals.

While the invention has been described with regard to one type of array using an LED light source, it will be appreciated that others may be substituted. For example, laser, halogen or mercury light sources may be substituted for the LED's with variable aperture arrays such as mechanically movable masks or alternatively electrically-actuated masks such as PLZT arrays used to control screen illumination. PLZT is an abbreviation for a lead lanthanum zirconate titanate electro-optical material whose optical properties can be changed by an electric field. Programmable electroluminescent light panels which may be selectively illuminated may also be used and do not require a separate light source. Illuminating panels or aperture arrays need not be linear, but can be areal and cover the area of the frame so that as a respective frame of the photoconductive web underlies the panel array, illumination may be then selectively provided, as in a flash-type exposure, of only the area of the screen that overlies the area of the photoconductor where the continuous-tone information is or was imaged.

The invention is not limited to the use of a photoconductor with an integral screen. The screen may be separate from the photoconductor and when it is so, may be positioned adjacent the surface of the photoconductor that is to be developed. An exposure source illuminates a halftone pattern upon the photoconductor at locations on the image frame wherein a latent electrostatic image of the continuous-tone image on the original document sheet is formed.

While the invention has been described with regard to a flash exposure of a document, other types of exposure are also contemplated. For example, the image may be scanned upon the electrostatically charged photoconductor and may be imaged thereon using either a scanning reflection or transmission exposure of the original or using light which has been electronically generated from say a bit stream. In the former, segments of the original are scanned by a light source and the light modulated by the document is imaged upon the photoconductor. In the latter, the information contents of a document are digitalized into electrical signals by a suitable electronic image "reading" device and these signals used to modulate a light source, such as a laser or LED array, which are then imaged upon the photoconductor. The image for the screen itself would be imaged upon the photoconductor independently of the imaging source by the techniques described herein of selectively exposing a portion of the integral screen onto the photoconductor surface where the information is desired to be screened and not exposing the screen in areas of the frame where information is not desired to be screened. While a separate light source for exposing the screen is suggested, it is also possible to use the same light source such as a laser in different modes to expose the screen pattern and the image pattern. For example, with the use of a rotating mirror, a laser beam can, in one orientation of a mirror arrangement, expose a screen pattern in the photoconductor from the "backside thereof" so that a charge pattern on the photoconductive surface is modulated with the screen pattern. This screen pattern may be selectively provided in certain portions of the image frame by the variable aperture arrays described above so that screening is only provided on areas used to reproduce continuous-tone information. In a second orientation of the mirror, the laser can be used to expose the photoconductive surface directly with a signal modulated with image information of both the continuous-tone and line-type information.

The invention in its broader aspects also contemplates a method and apparatus for reproducing a composite original document formed of a continuous-tone information and line-type information by the steps of (a) forming a halftone pattern screen image on an entire image frame, (b) imaging the entire document on the image frame, (c) erasing selectively the areas of charge outside the continuous-tone information areas via signals indicating the locations to be erased, (d) imaging the entire document on a second image frame, (e) erasing selectively the areas of charge representing the continuous-tone information, and (f) transferring the two images in register onto the same surface of a copy sheet to form a reproduction. In order to form the halftone screen pattern on the one image frame, an integral screen photoconductor is used as described herein, however, a linear electroluminescent light panel is positioned proximate the web transverse to the direction of web travel. The panel would essentially take the place of LED array 58. The electroluminescent panel when energized would be used to illuminate the screen pattern over an entire image frame. A linear LED array may then be positioned facing the opposite surface of the web to selectively erase charge in accordance with signals designating the location of the continuous-tone areas.

Thus, an electrophotographic reproduction apparatus has been described having the ability to automatically discriminate image segments which contain continuous-tone information, and to selectively screen only those portions of the photoconductor which are to reproduce those image segments.

The invention has been described in detail with particular reference to preferred embodiments thereof, but it will be understood that variations and modifications can be effected within the spirit and scope of the invention.

We claim:

1. A method for discriminating a continuous-tone segment of an original document from other portions of the document so that the continuous-tone segment can be reproduced using halftone screening techniques, the method including the steps of:

converting the original document image into a series of electrical signals characteristic of the optical density gray level of image pixels;

calculating the gray level histogram for pixels within defined regions of the original document image;

defining high, low, and intermediate ranges of gray level densities for image pixels;

calculating the gray level histograms for pixels within defined subregions of those of said defined regions whose gray level histograms contain more than a predetermined percent of pixels of intermediate gray level density values;

providing signals related to the position of the continuous-tone segments on the basis of the gray level histograms for each subregion of the original image;

locating boundaries of the continuous-tone segments based on said signals related to the position of the continuous-tone segments 1; and selectively screening said located continuous-tone segments.

2. A method as defined in claim 1 wherein said step of providing signals related to the position of the continuous-tone segments includes the step of identifying subregions having histograms containing more than a predetermined percent of pixels of intermediate gray level density values as being continuous-tone segments.

3. A method as defined in claim 1 wherein said step of providing boundary signals related to the position of the continuous-tone segments includes the step of identifying regions (1) having histograms containing more than a predetermined percent of pixels of intermediate gray level density values as being regions of said continuous-tone segments and (2) having histograms containing less than the predetermined percent of pixels of intermediate gray level density values as being regions of said other image area portions.

4. A method as defined in claim 1 further comprising the steps of:

imaging the original document onto a photoconductive member to form a developable electrostatic latent image of the document on an area of the photoconductive member; and forming in response to said boundary signals an electrostatic latent halftone pattern image on the portion of the area of the photoconductive member which is to form the reproduction of the continuous-tone segment.

5. The method according to claim 4 wherein the photoconductive member is moved in a predetermined direction and the latent halftone pattern image is formed by illumination of the photoconductive member through a halftone screen.

6. Apparatus for discriminating a continuous-tone segment of an original document from other portions of the document so that the continuous-tone segment can be reproduced using halftone screening techniques, the apparatus comprising:

scanner means for converting the original document image into a series of electrical signals characteristic of the optical density gray level of image pixels;

means for calculating the gray level histogram for pixels within defined regions of the original document image;

means defining high, low, and intermediate ranges of gray level densities for image pixels;

means for calculating the gray level histograms for pixels within defined subregions of those of said defined regions whose gray level histograms contain more than a predetermined percent of pixels of intermediate gray level density values;

means for providing signals related to the position of the continuous-tone segments on the basis of the gray level histograms for each subregion of the original image;

means for locating boundaries of said continuous-tone segments based on said signals related to the position of the continuous-tone segments 1; and a screen for selectively processing said located continuous-tone segments.

7. Apparatus as defined in claim 6 wherein said means for providing signals related to the position of the continuous-tone segments includes means for identifying subregions having histograms containing more than a predetermined percent of pixels of intermediate gray level density values as being continuous-tone segments.

8. Apparatus as defined in claim 6 wherein said means for providing boundary signals related to the position of the continuous-tone segments includes means for identifying regions having histograms containing more than a predetermined percent of pixels of intermediate gray level density values as being regions of said continuous-tone segments and having histograms containing less than the predetermined percent of pixels of intermediate gray level density values as being regions of said other portions.

9. Apparatus as defined in claim 6 further comprising:
means for imaging the original document onto a photoconductive member to form a developable electrostatic latent image of the document on an area of the photoconductive member; and
means for forming in response to said boundary signals an electrostatic latent halftone pattern image on the portion of the area of the photoconductive member which is to form the reproduction of the continuous-tone segment.

10. Apparatus according to claim 9 wherein the photoconductive member is moved in a predetermined direction and the latent halftone pattern image is formed by illumination of the photoconductive member through a halftone screen.

* * * * *